(12) United States Patent
Srinivasan et al.

(10) Patent No.: US 8,054,886 B2
(45) Date of Patent: Nov. 8, 2011

(54) SIGNALING AND USE OF CHROMA SAMPLE POSITIONING INFORMATION

(75) Inventors: Sridhar Srinivasan, Redmond, WA (US); Chengjie Tu, Sammamish, WA (US); Shankar Regunathan, Bellevue, WA (US); Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1166 days.

(21) Appl. No.: 11/772,070

(22) Filed: Jun. 29, 2007

(65) Prior Publication Data

US 2008/0198936 A1    Aug. 21, 2008

Related U.S. Application Data

(60) Provisional application No. 60/891,030, filed on Feb. 21, 2007.

(51) Int. Cl.
| H04N 7/12 | (2006.01) |
| H04N 11/02 | (2006.01) |
| H04N 11/20 | (2006.01) |
| H04N 7/01 | (2006.01) |

(52) U.S. Cl. .................. 375/240.21; 348/450
(58) Field of Classification Search ............. 375/240.21; 348/450
See application file for complete search history.

(56) References Cited

U.S. PATENT DOCUMENTS

| 4,511,990 | A | 4/1985 | Hagiwara et al. |
| 4,626,825 | A | 12/1986 | Burleson et al. |
| 5,257,215 | A | 10/1993 | Poon |
| 5,414,469 | A | 5/1995 | Gonzales et al. |
| 5,465,118 | A | 11/1995 | Hancock et al. |
| 5,467,134 | A | 11/1995 | Laney et al. |
| 5,544,286 | A | 8/1996 | Laney |
| 5,611,038 | A | 3/1997 | Shaw et al. |
| 5,699,124 | A | 12/1997 | Nuber et al. |
| 5,737,023 | A | 4/1998 | Linzer |
| 5,764,296 | A | 6/1998 | Shin |
| RE35,910 | E | 9/1998 | Nagata et al. |
| 5,801,975 | A | 9/1998 | Thayer et al. |
| 5,821,986 | A | 10/1998 | Yuan et al. |
| 5,828,421 | A | 10/1998 | Boyce et al. |
| 5,864,637 | A | 1/1999 | Liu et al. |

(Continued)

FOREIGN PATENT DOCUMENTS

EP    0 600 613    6/1994

(Continued)

OTHER PUBLICATIONS

Malvar, Henrique et al. "YCoCg-R: A Color Space with RGB Reversibility and Low Dynamic Range", Jul. 2003.*

(Continued)

*Primary Examiner* — Michael Simitoski
(74) *Attorney, Agent, or Firm* — Klarquist Sparkman, LLP

(57) ABSTRACT

Rules for the signaling and interpretation of chroma position are described. One rule, called the short rule, defines fifteen discrete chroma centering positions and corresponding four-bit syntax element. Another rule, called the extended rule, defines 81 discrete chroma centering positions and corresponding seven-bit syntax elements. A described method includes receiving digital media data at a digital media encoder, determining chroma position information for the received digital media data, and representing the chroma position information with one or more syntax elements in an encoded bitstream. The one or more syntax elements are operable to communicate the chroma position information to a digital media decoder. The chroma position information facilitates an image rotation or flip.

42 Claims, 5 Drawing Sheets

U.S. PATENT DOCUMENTS

| | | | |
|---|---|---|---|
| 5,970,173 | A | 10/1999 | Lee et al. |
| 5,995,122 | A | 11/1999 | Hsieh et al. |
| 6,002,801 | A | 12/1999 | Strongin et al. |
| 6,061,782 | A | 5/2000 | Elliott et al. |
| 6,104,434 | A | 8/2000 | Nakagawa et al. |
| 6,115,031 | A | 9/2000 | Love |
| 6,151,612 | A | 11/2000 | Song |
| 6,239,815 | B1 | 5/2001 | Frink et al. |
| 6,256,347 | B1 | 7/2001 | Yu et al. |
| 6,259,810 | B1 | 7/2001 | Gill et al. |
| 6,389,071 | B1 | 5/2002 | Wilson |
| 6,396,422 | B1 | 5/2002 | Barkan |
| 6,418,166 | B1 | 7/2002 | Wu et al. |
| 6,483,938 | B1 | 11/2002 | Hennessey et al. |
| 6,499,060 | B1 | 12/2002 | Wang et al. |
| 6,510,177 | B1 | 1/2003 | De Bonet et al. |
| 6,519,288 | B1 | 2/2003 | Vetro et al. |
| 6,600,785 | B1 | 7/2003 | Nishigori et al. |
| 6,606,418 | B2 | 8/2003 | Mitchell et al. |
| 6,728,317 | B1 | 4/2004 | Demos |
| 6,778,711 | B2 | 8/2004 | Morita |
| 6,823,014 | B2 | 11/2004 | Kim |
| 6,831,951 | B2 | 12/2004 | Yamada |
| 6,909,459 | B2 | 6/2005 | Watson et al. |
| 6,937,291 | B1 | 8/2005 | Gryskiewicz |
| 7,155,055 | B2 | 12/2006 | Malvar |
| 7,242,717 | B2 | 7/2007 | Li et al. |
| 7,548,245 | B2 | 6/2009 | Evans et al. |
| 7,586,985 | B2 * | 9/2009 | Park et al. ............... 375/240.01 |
| 7,639,265 | B2 | 12/2009 | Evans et al. |
| 7,649,539 | B2 | 1/2010 | Evans et al. |
| 2001/0025292 | A1 | 9/2001 | Denk et al. |
| 2002/0009143 | A1 | 1/2002 | Arye |
| 2002/0064226 | A1 | 5/2002 | Bauer et al. |
| 2002/0145610 | A1 | 10/2002 | Barilovits et al. |
| 2002/0154693 | A1 | 10/2002 | Demos et al. |
| 2002/0186890 | A1 | 12/2002 | Lee et al. |
| 2003/0044076 | A1 | 3/2003 | Mitchell et al. |
| 2003/0128893 | A1 | 7/2003 | Castorina et al. |
| 2003/0151610 | A1 | 8/2003 | Kuriakin et al. |
| 2003/0202589 | A1 | 10/2003 | Reitmeier et al. |
| 2004/0008790 | A1 * | 1/2004 | Rodriguez ............... 375/240.26 |
| 2004/0042549 | A1 | 3/2004 | Huang et al. |
| 2004/0183949 | A1 | 9/2004 | Lundberg et al. |
| 2004/0184657 | A1 | 9/2004 | Lin et al. |
| 2004/0190771 | A1 | 9/2004 | Eid et al. |
| 2004/0213345 | A1 | 10/2004 | Holcomb et al. |
| 2004/0218678 | A1 | 11/2004 | Tardif |
| 2005/0013373 | A1 | 1/2005 | Lin et al. |
| 2005/0041878 | A1 | 2/2005 | Schwartz et al. |
| 2005/0047676 | A1 | 3/2005 | Kang et al. |
| 2005/0063471 | A1 * | 3/2005 | Regunathan et al. .... 375/240.21 |
| 2005/0089239 | A1 | 4/2005 | Brajovic |
| 2005/0123283 | A1 | 6/2005 | Li |
| 2005/0200630 | A1 | 9/2005 | Evans et al. |
| 2005/0243176 | A1 | 11/2005 | Wu et al. |
| 2006/0007502 | A1 | 1/2006 | Debevec et al. |
| 2007/0160134 | A1 * | 7/2007 | Segall ........................ 375/240.1 |
| 2007/0258641 | A1 | 11/2007 | Srinivasan et al. |
| 2007/0296732 | A1 | 12/2007 | Evans et al. |
| 2007/0296861 | A1 | 12/2007 | Evans et al. |
| 2008/0019449 | A1 | 1/2008 | Lin et al. |

FOREIGN PATENT DOCUMENTS

| | | |
|---|---|---|
| JP | 4-207684 | 7/1992 |
| JP | 2000-165866 | 6/2000 |
| JP | 2006-279741 | 10/2006 |
| WO | WO 99/59329 | 11/1999 |
| WO | WO 00/33581 | 6/2000 |
| WO | WO 01/95633 | 12/2001 |

OTHER PUBLICATIONS

Anonymous, "DivX Multi Standard Video Encoder," 2 pp.

Brainard et al., "Composite Television Coding: Subsampling and Interpolation," SMPTE Journal, pp. 717-724 (Aug. 1982).

Catmull et al., "A Class of Local Interpolating Splines," *Computer Aided Geometric Design*, Academic Press, pp. 317-326 (1974).

Dufaux et al., "Abstract: Motion-compensated generic coding of video based on a multi resolution data structure," 2 pp. (1993) [downloaded from the World Wide Web on Jan. 25, 2006].

Einarsson et al., "Mixed Resolution Video Coding for Low Bit-Rate Channels," Proc. Int'l Workshop on Coding Techniques for Very Low Bit-Rate Video: VLBV97, Linköping, Sweden, pp. 77-80 (Jul. 1997).

ISO/IEC, "ISO/IEC 11172-2: Information Technology—Coding of Moving Pictures and Associated Audio for Storage Media at up to About 1.5 Mbit/s," 122 pp. (1993).

ISO/IEC, "Information Technology—Coding of Audio-Visual Objects: Visual, ISO/IEC 14496-2, Committee Draft," 330 pp. (1998).

ITU, Recommendation H.261, "Line Transmission of Non-Telephone Signals," 28 pp. (Mar. 1993).

ITU, "ITU-T Recommendation H.262: Information Technology—Generic Coding of Moving Pictures and Associated Audio Information: Video," 218 pp. (1995).

ITU, "ITU-T Recommendation H.263: Video Coding for Low Bit Rate Communication," 167 pp. (1998).

ITU, "ITU-T Recommendation H.264: Advanced Video Coding for generic audiovisual services (May 2003)," 281 pp. (2004).

Iwahashi et al., "A Motion Compensation Technique for Downscaled Pictures in Layered Coding," IEICE Transactions on Comm., vol. E77-B, No. 8, pp. 1007-1012 (Aug. 1994).

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG & ITU-T VCEG, "Joint Final Committee Draft (JFCD) of Joint Video Specification," JVT-D157, 207 pp. (Aug. 2002).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Oct. 2005).

Keys, "Cubic Convolution Interpolation for Digital Image Processing," *Computer Graphics*, vol. ASSP-29, No. 6, pp. 1153-1160 (Dec. 1981).

Kwon et al., "Adaptive Bitrate Allocation in Spatial Scalable Video Coding of Fixed Total Bitrate," IEICE Trans. Fundamentals, vol. E81-A, No. 5, pp. 950-956 (May 1998).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitchell et al., "Reconstruction Filters in Computer Graphics," *Computer Graphics*, vol. 22, No. 4 pp. 221-228 (Aug. 1988).

Mook, "Next-Gen Windows Media Player Leaks to the Web," BetaNews, 17 pp. (Jul. 19, 2002) [Downloaded from the World Wide Web on Aug. 8, 2003].

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Segall, "Study of Upsampling/Downsampling for Spatial Scalability," JVT-Q083, Nice, France, 18 pp. (Oct. 2005).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sun et al., "Unified Solution for Spatial Scalability," JVT-R018, Bangkok, Thailand, 6 pp. (Jan. 2006).

Wien, "Variable Block-Size Transforms for Hybrid Video Coding," Dissertation, 182 pp. (Feb. 2004).

International Search Report and Written Opinion for PCT/US2008/054481, Aug. 5, 2008, 10 pages.

U.S. Appl. No. 60/341,674, filed Dec. 17, 2001, Lee et al.

U.S. Appl. No. 60/488,710, filed Jul. 18, 2003, Srinivasan et al.

U.S. Appl. No. 60/501,081, filed Sep. 7, 2003, Srinivasan et al.

Aaron, "Wyner-Ziv Coding of Motion Video," Information Systems Laboratory Stanford University, 11 pp. (last modified Nov. 7, 2002).

Agnoli, "QuickTime Pixel Format FourCCs," 5 pp. [Downloaded from the World Wide Web on Feb. 9, 2004].

Apple Computer, Inc., "Color Packing for Color Spaces (IM: ACI Ref)," 2 pp. [Downloaded from the World Wide Web on Feb. 9, 2004].

Apple Computer, Inc., "ColorSync Manager Reference: Color Packing for Color Spaces," 3 pp. [Downloaded from the World Wide Web on Feb. 9, 2004].

"Bitwise operation," from Wikipedia, the free encyclopedia, http://en.wikipedia.org/wiki/Bitwise_operation, printed on Jan. 2, 2008, 7 pages.

Cornell University, "RGBE Image Format Specifications," 1 p. (document dated Apr. 29, 1998) [Downloaded from the World Wide Web on Apr. 20, 2006].

FOURCC.org, "Compressed Formats," 17 pp. [Downloaded from the World Wide Web on Feb. 9, 2004].

FOURCC.org, "YUV Formats," 15 pp. [Downloaded from the World Wide Web on Feb. 9, 2004].

FOURCC.org, "RGB Formats," 6 pp. [Downloaded from the World Wide Web on Feb. 9, 2004].

Industrial Light & Magic, "Technical Introduction to OpenEXR," 13 pp. (Feb. 2005).

Jack, Video Demystified: A Handbook for the Digital Engineer, LLH Technology Publishing, pp. 15-34 (3d ed. 2001).

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Krapf et al., "HDRI: High Dynamic Range Image," Dosch Design, 18 pp. (2005).

Larson, "Overcoming Gamut and Dynamic Range Limitations in Digital Images", *Proceedings of the Sixth Color Imaging Conference*, 6 pp. (Nov. 1998).

Malvar, "Fast Progressive Image Coding Without Wavelets," *IEEE Data Compression Conf.*, 10 pp., Snowbird, Utah (Mar. 2000).

Mantiuk et al., "Perception-Motivated High Dynamic Range Video Encoding", *ACM Transactions on Graphics*, vol. 23, Issue 3, pp. 733-741 (Aug. 2004).

Microsoft Corporation, "4:2:0 Video Pixel Formats," 1 p. [Downloaded from the World Wide Web on Feb. 9, 2004].

Microsoft Corporation, "4:2:2 Video Pixel Formats," 1 p. [Downloaded from the World Wide Web on Feb. 9, 2004].

Microsoft Corporation, "FOURCC for Video Compression," 6 pp. [Downloaded from the World Wide Web on Feb. 9, 2004].

Microsoft Corporation, "FOURCC Codes," 1 p. [Downloaded from the World Wide Web on Feb. 16, 2004].

Microsoft Corporation, "Registered FOURCC Codes and WAVE Formats," 20 pp. (Sep. 2003) [Downloaded from the World Wide Web on Mar. 5, 2004].

Microsoft Corp., "Windows Media™ Photo Photographic Still Image File Format: Preliminary Specification, Version 0.9," 30 pp. (document dated Mar. 29, 2006) [Downloaded from the World Wide Web on Apr. 20, 2006].

Microsoft Corporation, "YUV Video Subtypes," 2 pp. [Downloaded from the World Wide Web on Feb. 16, 2004].

Motorola Corp., *M68000 8-/16-/32-Bit Microprocessors Programmer's Reference Manual*, Prentice-Hall, p. B-35 (5th ed. 1986).

Pirazzi et al., "Uncompressed Y'CbCr Video in QuickTime Files: Version Dec. 14, 1999," 37 pp., [Downloaded from the World Wide Web on Feb. 9, 2004].

Pittsburgh Supercomputing Center, "The IEEE Standard for Floating Point Arithmetic," 3 pp. [Downloaded from the World Wide Web].

"Re: GL_RGBA8 vs. GL_RGB5_A1 vs. GL_RGBA," Author: Dario Accornero; Jul. 25, 2003, p. 1; http//lists.apple.com/archives/Mac-opengl/2003/Jul/msg00154.html.

SMPTE, "SMPTE 274-1998: SMPTE Standard for Television—1920×1080 Scanning and Analog and Parallel Digital Interfaces for Multiple Picture Rates," 24 pp. (1998).

Sullivan et al., "Video Rendering With 8-Bit YUV Formats," 12 pp. [Downloaded from the World Wide Web on Feb. 9, 2004].

"The RADIANCE Picture File Format," 21 pp. (document dated 1991-1994) [Downloaded from the World Wide Web].

Ward, "High Dynamic Range Image Encodings," Anyhere Software, 28 pp. (undated document) [Downloaded from the World Wide Web].

Ward et al., "Subband Encoding of High Dynamic Range Imagery", *Proceedings of the 1st Symposium on Applied Perception in Graphics and Visualization*, pp. 83-90, Los Angeles, CA (2004).

Xu et al., "High-Dynamic Range Still-Image Encoding in JPEG 2000", IEEE Computer Graphics and Applications, pp. 57-64 (Nov./Dec. 2005).

PNG format [was: background image not displayed], Author: Claus Cyrny, Date: Dec. 7, 2001, pp. 3.

SGI DMediaPro DM3: High-Definition and Standard-Definition Video I/O Option, Author: SGI, pp. 2, Date: Jul. 18, 2003.

Notice on the First Office Action dated Jul. 26, 2010, from Chinese Patent Application No. 200880005427.3, 9 pp.

Paul et al., "Stabilizing Mantissa Rates in Feedback Systems with Floating-Point Quantization and Time-Variant Delays," *IEEE Symp. on Circuits and Systems*, pp. 501-504 (Jul. 2004).

Notice on the Second Office Action dated Jun. 2, 2011, from Chinese Patent Application No. 200880005427.3 (with English translation), 10 pp.

* cited by examiner

Software 180 implementing described techniques and tools for signaling and use of chroma position information ○ luma sample
● chroma sample (shown slightly displaced for clarity)

○ luma sample
● chroma sample

SIGNALING AND USE OF CHROMA SAMPLE POSITIONING INFORMATION

RELATED APPLICATION INFORMATION

This application claims the benefit of U.S. Provisional Patent Application No. 60/891,030, filed Feb. 21, 2007, the disclosure of which is hereby incorporated by reference.

SUMMARY

In summary, the detailed description is directed to aspects of encoding and decoding digital media data, and in particular, encoding and decoding digital media data in digital media encoders and decoders.

For example, rules for the signaling and interpretation of chroma position are described. One rule, called the short rule, defines fifteen discrete chroma centering positions and a corresponding four-bit syntax element. Another rule, called the extended rule, defines 81 discrete chroma centering positions and corresponding seven-bit syntax elements. Variations on these rules and other aspects also are described.

In one aspect, a method comprises receiving digital media data at a digital media encoder; determining chroma position information for the received digital media data; representing the chroma position information with one or more syntax elements in an encoded bitstream, wherein the syntax element is operable to communicate the chroma position information to a digital media decoder, and wherein the chroma position information facilitates an image rotation or flip; and outputting the encoded bitstream. In another aspect, the chroma position information is decoded.

This summary is provided to introduce a selection of concepts in a simplified form that are further described below in the detailed description. This summary is not intended to identify key features or essential features of the claimed subject matter, nor is it intended to be used to limit the scope of the claimed subject matter.

The foregoing and other objects, features, and advantages will become more apparent from the following detailed description, which proceeds with reference to the accompanying figures.

DETAILED DESCRIPTION

The present application relates to techniques and tools for efficient compression and decompression of digital media data. In various described embodiments, a still image encoder and/or decoder incorporate techniques for compressing and/or decompressing image data.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific digital media formats, other formats also can be used.

The various techniques and tools can be used in combination or independently. Different embodiments implement one or more of the described techniques and tools. Some techniques and tools described herein can be used in a still image encoder or decoder, or in some other system not specifically limited to still image encoding or decoding.

I. Computing Environment

Figure 1:
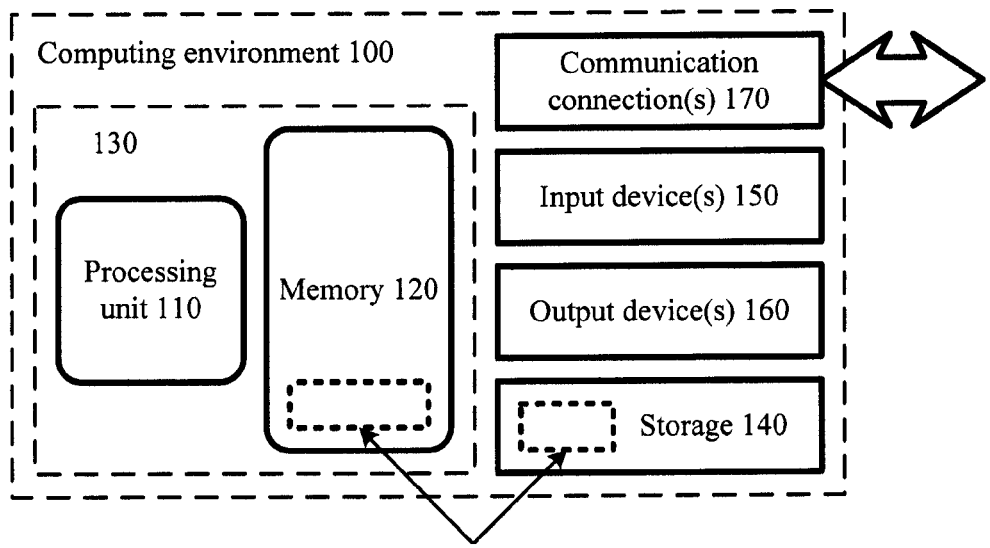
FIG. 1 is a block diagram of a suitable computing environment for implementing techniques and tools for signaling and use of chroma position information in one or more described implementations.

FIG. 1 illustrates a generalized example of a suitable computing environment 100 in which several of the described embodiments may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing a digital media encoder or decoder with one or more of the described techniques and tools.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs (including high-definition DVDs), or any other medium which can be used to store information and which can be accessed within the computing environment 100. The storage 140 stores instructions for the software 180 implementing the digital media encoder or decoder.

The input device(s) 150 may be a touch input device such as a keyboard, mouse, pen, or trackball, a voice input device, a scanning device, still image capture device (e.g., digital camera), or another device that provides input to the computing environment 100. For audio or video encoding, the input device(s) 150 may be a sound card, video card, TV tuner card, or similar device that accepts audio or video input in analog or digital form, or a CD-ROM or CD-RW that reads audio or video samples into the computing environment 100. The output device(s) 160 may be a display, printer, speaker, CD- or DVD-writer, or another device that provides output from the computing environment 100.

The communication connection(s) 170 enable communication over a communication medium to another computing entity. The communication medium conveys information such as computer-executable instructions, digital media input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media include memory 120, storage 140, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "select" and "receive" to describe computer operations in a computing environment. These terms are high-level abstractions for operations performed by a computer, and should not be confused with acts performed by a human being. The actual computer operations corresponding to these terms vary depending on implementation.

II. Signaling and Use of Chroma Sample Position Information

Described embodiments provide advanced still image codec bitstream features, including the ability to perform cardinal rotations and mirror flips on an image without a full decode and re-encode. This feature can be supported by multiple design techniques, including:

1. Lapped Biorthogonal Transform (LBT)—
   a. The symmetry of basis functions of the LBT allows a mirror flip of spatial data within the transform block by merely negating the sign of odd-symmetric transform coefficients. This is true for both spatial orientations, X and Y.
   b. The isotropic nature of basis functions of the LBT allows the spatial data within the transform block to be transposed by merely transposing the transform coefficients. Cardinal rotations can be implemented as combinations of transpose and mirror flips.
2. Block, macroblock and tile spatial hierarchies
   a. In order to realize a mirror flip within a macroblock of data, the modified transform blocks are scanned in the laterally inversed sequence (in X and/or Y depending on the requirement). Likewise, within a tile the modified macroblocks are scanned in the laterally inversed order, and within an image the modified tiles are scanned in the laterally inversed order.
   b. In order to realize a transpose, the modified blocks, macroblocks and tiles are transposed. Cardinal rotations can be implemented as combinations of transpose and mirror flips.
3. Signaling of an inscribed area within an extended crop area—this allows for non-macroblock aligned images to be mirror flipped or rotated freely and the non-zero offset of the image from the macroblock grid to be allowed in any direction, not merely the right and bottom.
4. Signaling of position of chroma sample—This allows chroma sub-sampled color formats such as YUV4:2:0 and YUV4:2:2 to be rotated by permitting the independent specification of the location of the chroma sample. It also allows the relative alignments of luma/chroma sample positions to be signaled to the decoder, so an upsampling filter with the appropriate phase can be chosen.

Signaling of positions of chroma samples is covered in detail below. Described signaling techniques allow images to be rotated within the compressed domain with no loss of information and no significant change in compressed size. This is a desirable bitstream feature and has complexity benefits.

A. Chroma Centering

An image consists of multiple planes of data. In the primary space, an image is typically made up of 3 color planes corresponding respectively to the Red, Green and Blue (R, G and B) channels. In the internal color space used in most popular codecs, an image is made up of 3 converted color planes often referred to as Y, U and V. The Y component is called the luminance or luma plane, which roughly corresponds to a grayscale rendering of the image. The U and V components are referred to as chroma, chrominance or color difference planes. The nomenclature Y, U, V is used here in a generic sense with the understanding that described techniques and tools are applicable to a variety of "YUV type" color formats such as YCbCr, YCoCg, etc. A color format called YUV 4:4:4 has one U and one V sample for each Y sample.

The human eye is very sensitive to the intensity variation and resolution of the luminance channel. It is relatively less sensitive to chroma. This allows for a simple means of reducing pixel count in the data by sub-sampling or dropping the resolution of the chroma (U and V) components.

Two chroma sub-sampling techniques are popular:
1. YUV 4:2:2—here, the spatial resolution of U and V in the X direction is reduced by a factor of 2 (usually with some anti-aliasing filter).
2. YUV 4:2:0—here, the spatial resolution of U and V in both X and Y directions is reduced by a factor of 2.

For the YUV 4:2:2 case, each chroma sample corresponds to two luma samples. Likewise, for the YUV 4:2:0 case, each chroma sample corresponds to four luma samples.

The chroma subsampling is usually performed after filtering the samples with an anti-aliasing filter.

The phase of this filter determines the relative position of the chroma and luma samples.

When converting back from either of these formats to YUV 4:4:4 for the purpose of display or printing, the knowledge of the relative sample positions must be available so that the proper upsampling filter can be used.

One approach to this problem is to either mandate or signal the exact upsampling filter that should be used. However, this approach imposes additional requirements on the system and may not compatible with the rest of the industry.

A simpler and more flexible solution of indicating how to reconstruct full resolution data from a sub-sampled version is by signaling "position" information regarding alignment of luma and chroma samples. This approach allows the decoder to use any upsampling filter whose phase is matched to the position information.

While this approach does not specify a unique reconstruction rule (i.e. unique upsampling filter), it has a sufficiently good performance and has widespread acceptance.

Figure 2:
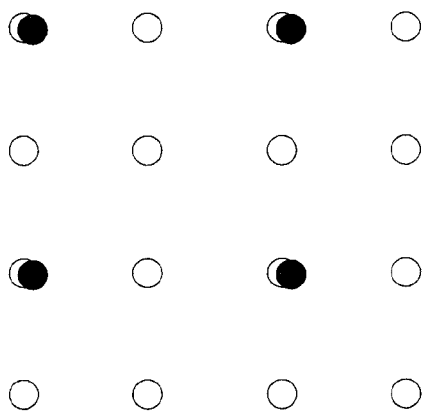
FIG. 2 is a diagram showing a first example chroma sample position rule.
Figure 3:
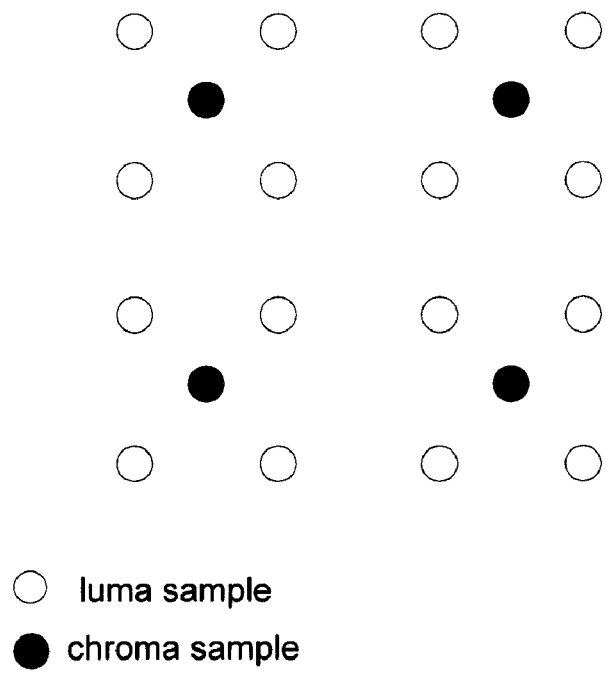
FIG. 3 is a diagram showing a second example chroma sample position rule.

The "position" of a sub-sampled data point is the location or phase of this value within a full-resolution grid. The position information is used to pick between upsampling filters that are compliant with the phase constraint. The position information is two dimensional in general—a shift is specified in both the horizontal and vertical directions. FIGS. 2 and 3 show examples of two common chroma position rules used for YUV 4:2:0. In FIG. 2, phase=(0, 0), and in FIG. 3, phase=(0.5, 0.5) in luma pixel units.

B. Chroma Centering with Image Rotation/Flips

The two examples shown in FIGS. 2 and 3 are the most common cases for YUV 4:2:0 sub-sampling of chroma. These two centering rules are usually sufficient for video data but usually insufficient for image data. A difference between video and images is that video is seldom rotated or mirror flipped, whereas images are very often rotated and/or mirror flipped.

To see why the two centering rules are usually insufficient for image data, consider the following cases.

Case 1: Consider a mirror flip along the horizontal direction for the centering example 1. Now the chroma sample is co-located not with the top left luma sample but with the top right luma sample. The corresponding phase of chroma is (1, 0) in luma pixel units, which is not defined by the rules shown in FIGS. 2 and 3.

Case 2: Likewise, a mirror flip along the vertical direction of an image with chroma position shown in example 1 results in a chroma position with (0, 1) phase in luma pixel units which is not defined by the rules shown in FIGS. 2 and 3.

The above cases show the usefulness of defining additional chroma centering rules as side information to a bitstream to aid the process of correct reconstruction when the image is subject to the basic operations of cardinal rotations and mirror flips.

C. Chroma Centering with Interlace Data

Another complication is introduced by interlaced video. A frame of interlaced video contains two fields—the top field and the bottom field. A field of video may be stored at its full resolution with no chroma downsampling. More commonly, it is carried in a chroma downsampled form such as YUV 4:2:2 where the chroma is downsampled in the X direction by a factor of 2, and matches the luma resolution in the Y direction. In the recent video codecs, however, a field of interlaced video is defined in the YUV 4:2:0 space so its chroma is downsampled by a factor of 2 in both X and Y directions.

This operation often results in a chroma centering with a phase shift of 0.25 or 0.75 (in luma pixel units) in the vertical direction depending on whether it is top or bottom field data, respectively. Such a centering can be used to ensure the following:

1. Alternating lines of chroma in the frame are produced by alternating fields.

Chroma centering is uniform across successive lines of the frame.

Figure 4:
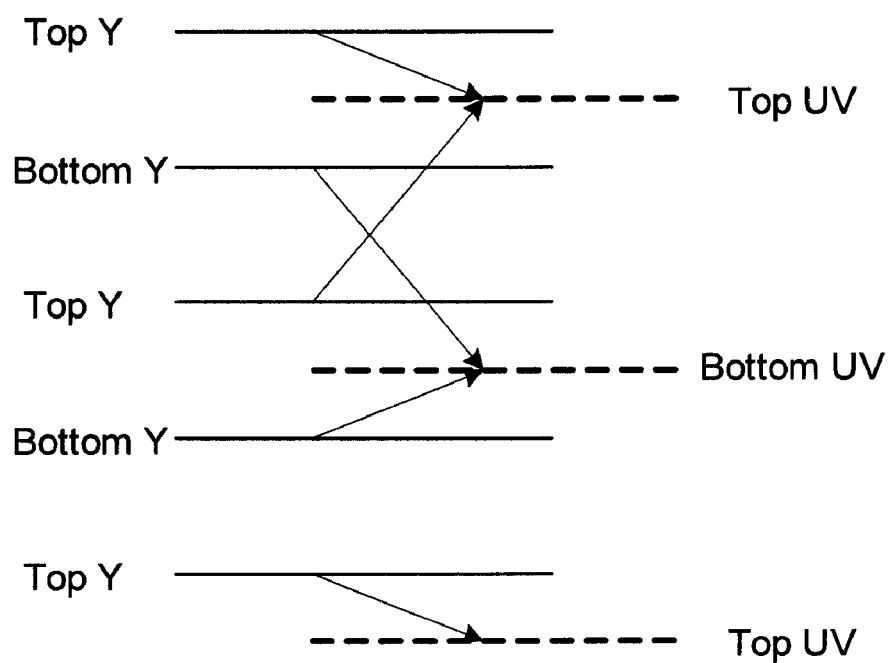
FIG. 4 is a diagram showing chroma downsampling of interlace data.

The chroma downsampling of interlace data is shown in FIG. 4. The X axis downsampling may have any phase and is not relevant to this discussion. Therefore, the figure only shows the Y axis centering and displacements.

D. Chroma Positions

With the above in mind, we define two rules for chroma position. The first rule, referred to as the short rule defines 15 chroma centering phases. This rule is signaled using a 4 bit word within an image bitstream. Table 1 enumerates the values and corresponding phases of the syntax element CHROMA_CENTERING_SHORT in one implementation. In the example shown in Table 1, CHROMA_CENTERING_SHORT can take on values between 0 and 15, but the value 14 is reserved and not used. CHROMA_CENTERING_SHORT can be signaled, for example, in an image header or an image plane header.

TABLE 1

Enumeration of values of CHROMA_CENTERING_SHORT and corresponding phases.

| CHROMA_CENTERING_SHORT | X Phase = 0 | X Phase = 0.5 | X Phase = 1 |
|---|---|---|---|
| Y Phase = 0 | 0 | 10 | 1 |
| Y Phase = 0.25 | 6 | 12 | 7 |
| Y Phase = 0.5 | 4 | 15 | 5 |
| Y Phase = 0.75 | 8 | 13 | 9 |
| Y Phase = 1 | 2 | 11 | 3 |

A second and more comprehensive chroma centering rule, referred to as extended rule, is also described. This rule has the advantage of allowing an image to be translated, without loss of data, by any integer number of pixels. This is in addition to rotates and mirror flips.

In one implementation, the extended rule is signaled with a seven-bit word (CHROMA_CENTERING_LONG) within the image bitstream, and the enumeration of phases corresponding to the syntax element CHROMA_CENTERING_LONG is as follows. CHROMA_CENTERING_LONG=CHROMA_CENTERING_X+CHROMA_CENTERING_Y*9, where CHROMA_CENTERING_X and CHROMA_CENTERING_Y are syntax elements defining the phase in the X and Y directions, as shown below in Table 2. CHROMA_CENTERING_X and CHROMA_CENTERING_Y take values between 0 and 8. Therefore, CHROMA_CENTERING_LONG can take on values between 0 and 80. Values outside this range are reserved. CHROMA_CENTERING_LONG, CHROMA_CENTERING_X and/or CHROMA_CENTERING_Y can be signaled, for example, in an image header or an image plane header.

TABLE 2

Enumeration of values of CHROMA_CENTERING_X and CHROMA_CENTERING_Y and corresponding phase

| CHROMA_CENTERING_X or Y | Phase X or Y |
|---|---|
| 8 | −0.5 |
| 7 | −0.25 |
| 0 | 0 |
| 1 | 0.25 |
| 2 | 0.5 |
| 3 | 0.75 |
| 4 | 1.0 |
| 5 | 1.25 |
| 6 | 1.5 |

It is possible to use other mappings in place of Tables 1 and 2. It is also possible to use other encodings of the CHROMA_CENTERING elements such as variable length codes.

III. Block Transform-Based Coding

Transform coding is a compression technique used in many digital media (e.g., audio, image and video) compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

Figure 5:
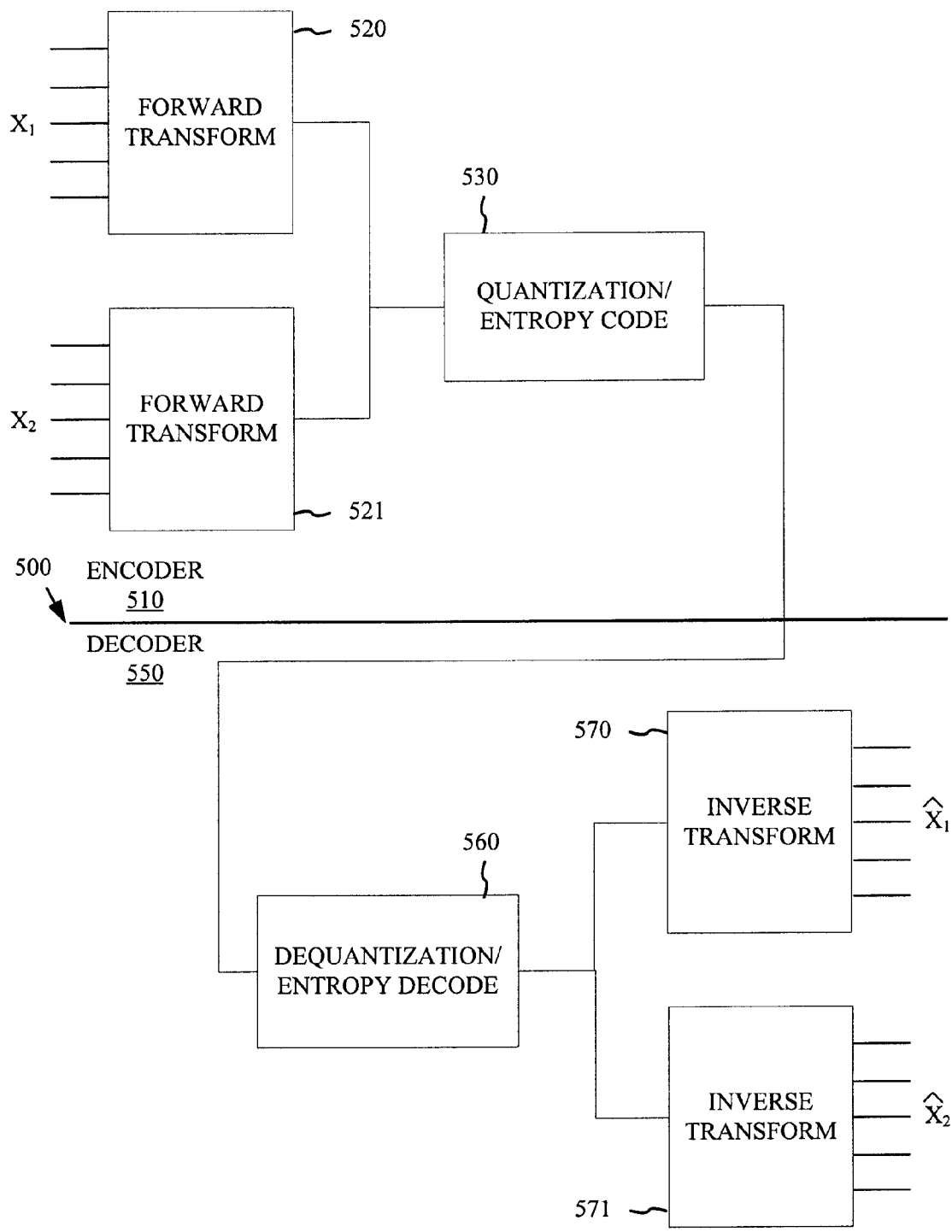
FIG. 5 is a block diagram of a block transform-based codec.

More specifically, a typical block transform-based encoder/decoder system 500 (also called a "codec") shown in FIG. 5 divides the uncompressed digital image's pixels into fixed-size two dimensional blocks ($X_1, \ldots X_n$), each block possibly overlapping with other blocks. At an encoder 510, a linear transform 520-521 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 530 (i.e., reduced in resolution, such as by dropping least significant bits of the coefficient values or otherwise mapping values in a higher resolution number set to a lower resolution), and also entropy or variable-length coded 530 into a compressed data stream. At decoding, the transform coefficients will inversely transform 570-571 to nearly reconstruct the original color/spatial sampled image/video signal (reconstructed blocks $\hat{X}_{\hat{1}}, \hat{X}_{\hat{n}}$).

The block transform 520-521 can be defined as a mathematical operation on a vector x of size N. Most often, the operation is a linear multiplication, producing the transform domain output y=Mx, M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations. The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 550, the inverse of these operations (dequantization/entropy decoding 560 and inverse block transform 570-571) are applied on the decoder 550 side, as shown in FIG. 5. While reconstructing the data, the inverse matrix $M^{-1}$ (inverse transform 570-571) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

IV. Exemplary Encoder/Decoder Implementation

Figure 6:
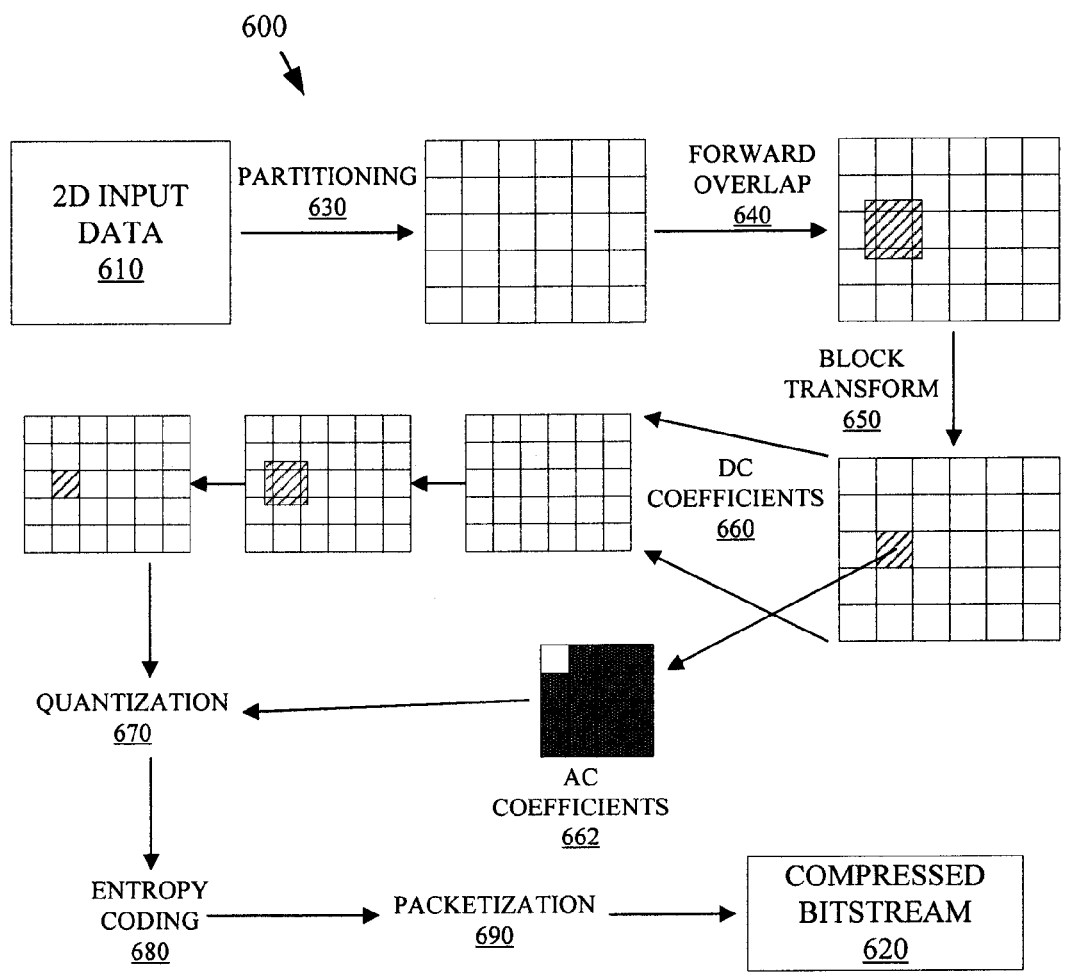
FIG. 6 is a flow diagram of a representative encoder.
Figure 7:
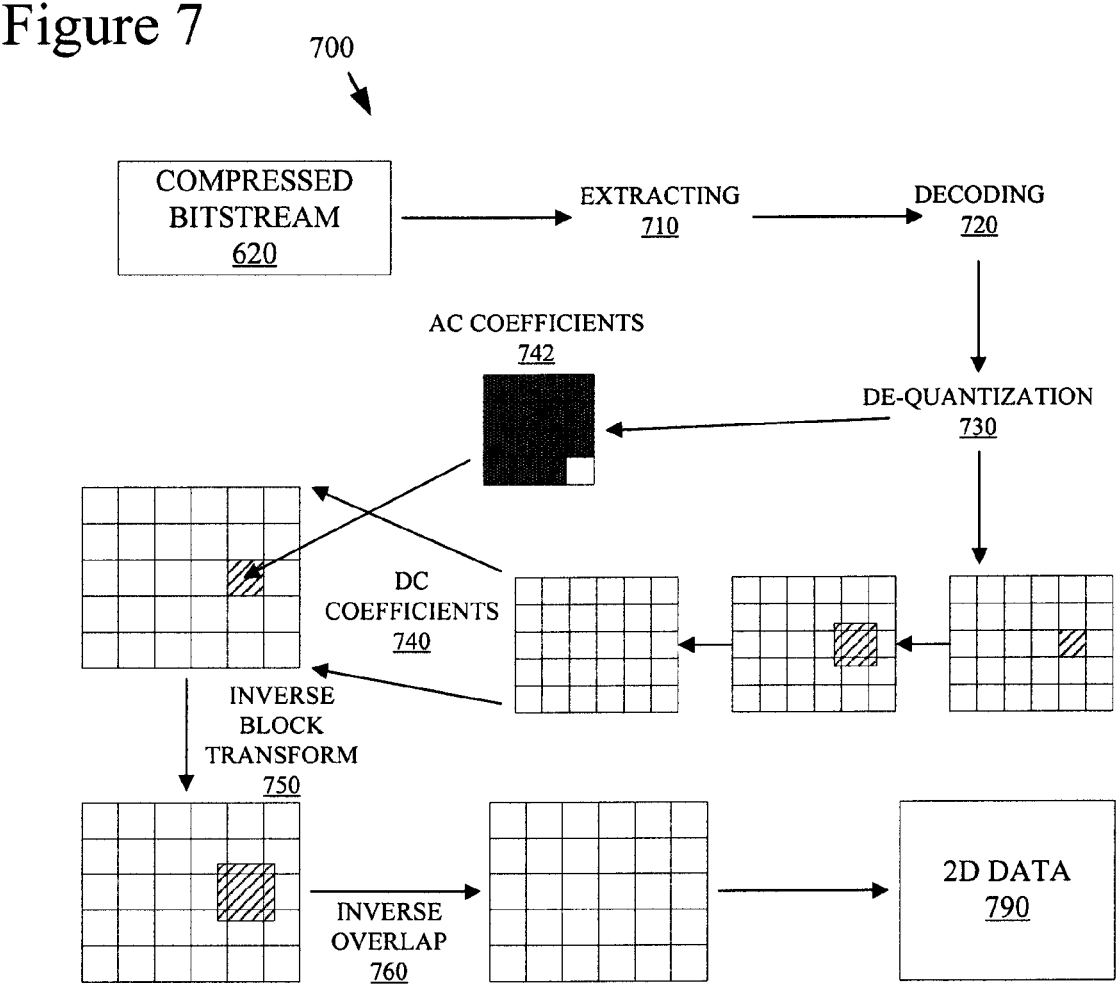
FIG. 7 is a flow diagram of a representative decoder.

FIGS. 6 and 7 are a generalized diagram of the processes employed in a representative 2-dimensional (2D) data encoder 600 and decoder 700. The diagrams present a generalized or simplified illustration of a compression/decompression system that can be used to implement described techniques and tools. In alternative compression/decompression systems, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 600 produces a compressed bitstream 620 that is a more compact representation (for typical input) of 2D data 610 presented as input to the encoder. For example, the 2D data input can be an image, a frame of a video sequence, or other data having two dimensions. The 2D data encoder divides a frame of the input data into blocks (illustrated generally in FIG. 6 as partitioning 630), which in the illustrated implementation are non-overlapping 4×4 pixel blocks that form a regular pattern across the plane of the frame. These blocks are grouped in clusters, called macroblocks, which are 16×16 pixels in size in this representative encoder. In turn, the macroblocks are grouped into regular structures called tiles. The tiles also form a regular pattern over the image, such that tiles in a horizontal row are of uniform height and aligned, and tiles in a vertical column are of uniform width and aligned. In the representative encoder, the tiles can be any arbitrary size that is a multiple of 16 in the horizontal and/or vertical direction. Alternative encoder implementations can divide the image into block, macroblock, tiles, or other units of other size and structure.

A "forward overlap" operator 640 is applied to each edge between blocks, after which each 4×4 block is transformed using a block transform 650. This block transform 650 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004. The overlap operator 640 can be the reversible overlap operator described by Tu et al., U.S. patent application Ser. No. 11/015,148, entitled, "Reversible Overlap Operator for Efficient Lossless Data Compression," filed Dec. 17, 2004; and by Tu et al., U.S. patent application Ser. No. 11/035,991, entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 660 of each 4×4 transform block is subject to a similar processing chain (tiling, forward overlap, followed by 4×4 block transform). The resulting DC transform coefficients and the AC transform coefficients 662 are quantized 670, entropy coded 680 and packetized 690.

The decoder performs the reverse process. On the decoder side, the transform coefficient bits are extracted 710 from their respective packets, from which the coefficients are themselves decoded 720 and dequantized 730. The DC coefficients 740 are regenerated by applying an inverse transform, and the plane of DC coefficients is "inverse overlapped" using a suitable smoothing operator applied across the DC block edges. Subsequently, the entire data is regenerated by applying the 4×4 inverse transform 750 to the DC coefficients, and the AC coefficients 742 decoded from the bitstream. Finally, the block edges in the resulting image planes are inverse overlap filtered 760. This produces a reconstructed 2D data output 790.

In an exemplary implementation, the encoder 600 (FIG. 6) compresses an input image into the compressed bitstream 620 (e.g., a file), and the decoder 700 (FIG. 7) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 610 compressed by the illustrated encoder 600/decoder 700 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 600 tiles the input image or picture into macroblocks. In an exemplary implementation, the encoder 600 tiles the input image into 16×16 pixel areas (called "macroblocks") in the Y channel (which may be 16×16, 16×8 or 8×8 areas in the U and V channels depending on the color format). Each macroblock color plane is tiled into 4×4 pixel regions or blocks. Therefore, a macroblock is composed for the various color formats in the following manner for this exemplary encoder implementation:

For a grayscale image, each macroblock contains 16 4×4 luminance (Y) blocks.
For a YUV4:2:0 format color image, each macroblock contains 16 4×4 Y blocks, and 4 each 4×4 chrominance (U and V) blocks.
For a YUV4:2:2 format color image, each macroblock contains 16 4×4 Y blocks, and 8 each 4×4 chrominance (U and V) blocks.
For a RGB or YUV4:4:4 color image, each macroblock contains 16 blocks each of Y, U and V channels.

Accordingly, after transform, a macroblock in this representative encoder 600/decoder 700 has three frequency sub bands: a DC sub band (DC macroblock), a low pass sub band (low pass macroblock), and a high pass sub band (high pass macroblock). In the representative system, the low pass and/or high pass sub bands are optional in the bitstream—these sub bands may be entirely dropped.

Further, the compressed data can be packed into the bitstream in one of two orderings: spatial order and frequency order. For the spatial order, different sub bands of the same macroblock within a tile are ordered together, and the resulting bitstream of each tile is written into one packet. For the frequency order, the same sub band from different macroblocks within a tile are grouped together, and thus the bitstream of a tile is written into three packets: a DC tile packet, a low pass tile packet, and a high pass tile packet. In addition, there may be other data layers.

Thus, for the representative system, an image is organized in the following "dimensions":

Spatial dimension: Frame→Tile→Macroblock;
Frequency dimension: DC|Low pass|High pass; and
Channel dimension: Luminance|Chrominance|Chrominance_1 . . . (e.g. as Y|U|V).

The arrows above denote a hierarchy, whereas the vertical bars denote a partitioning.

Although the representative system organizes the compressed digital media data in spatial, frequency and channel dimensions, the flexible quantization approach described here can be applied in alternative encoder/decoder systems that organize their data along fewer, additional or other dimensions. For example, the flexible quantization approach can be applied to coding using a larger number of frequency bands, other format of color channels (e.g., YIQ, RGB, etc.), additional image channels (e.g., for stereo vision or other multiple camera arrays).

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method comprising:
with a computing device,
receiving digital image data for an image, the digital image data comprising downsampled chroma information;
determining chroma position information for the downsampled chroma information according to a chroma position rule that maps the chroma position information to phase information in an X dimension and phase information in a Y dimension, and wherein the chroma position rule facilitates horizontal and vertical flipping or rotating of the image;

representing the chroma position information with one or more syntax elements included in an encoded bitstream; and outputting the encoded bitstream.

2. The method of claim 1, wherein the chroma information is downsampled by a factor of two in one or more dimensions.

3. The method of claim 1, wherein the phase information in the X dimension comprises half-pixel-unit phase information.

4. The method of claim 1, wherein the phase information in the Y dimension or the X dimension comprises quarter-pixel-unit phase information.

5. The method of claim 1, wherein the chroma position rule maps the chroma position information to chroma centering phases that include X phase positions 0, 0.5 and 1, and Y phase positions 0, 0.25, 0.5, 0.75, and 1, where the phase positions are in pixel units.

6. The method of claim 1, wherein the one or more syntax elements comprises a single syntax element that represents both the phase information in the X dimension and the phase information in the Y dimension.

7. The method of claim 1, wherein the one or more syntax elements comprises a first syntax element that represents the phase information in the X dimension and a second syntax element that represents the phase information in the Y dimension.

8. The method of claim 1, wherein the digital image data comprises interlaced digital image data.

9. The method of claim 1, wherein the chroma position rule maps the chroma position information to chroma centering phases that include phase positions −0.5, −0.25, 0, 0.25, 0.5, 0.75, 1, 1.25 and 1.5, where the phase positions are in pixel units.

10. The method of claim 9, wherein the chroma position rule also facilitates translation of the image by an integer number of pixels.

11. The method of claim 1, further comprising using the chroma position information to upsample the downsampled chroma information.

12. A method comprising:
with a computing device,
receiving encoded digital image data for an image, the encoded digital image data comprising chroma information;
processing chroma position information for the chroma information, wherein the chroma position information indicates a position of the chroma information relative to luminance information in an X dimension and in a Y dimension and facilitates horizontal and vertical flipping or rotating of the image, and wherein the processing comprises processing one or more syntax elements of the encoded digital image data that signal the chroma position information; and
outputting a decoded bitstream.

13. The method of claim 12, wherein the chroma information is downsampled by a factor of two in one or more dimensions.

14. The method of claim 12, wherein the chroma position information indicates that chroma information is offset relative to the luminance information in the X dimension by a half pixel in luma pixel units.

15. The method of claim 12, wherein the chroma position information indicates that the chroma information is offset relative to the luminance information in the Y dimension or the X dimension by a quarter pixel in luma pixel units.

16. The method of claim 12, wherein the one or more syntax elements comprise a single syntax element that represents both the chroma position information in the X dimension and the chroma position information in the Y dimension.

17. The method of claim 12, wherein the one or more syntax elements comprise a first syntax element that represents the chroma position information in the X dimension and a second syntax element that represents the chroma position information in the Y dimension.

18. The method of claim 12, further comprising using the chroma position information to upsample the chroma information.

19. A method comprising:
using a computing device,
receiving compressed digital image data for a compressed image, the compressed digital image data comprising downsampled image channel information and one or more syntax elements indicating image channel position information;
decoding the one or more syntax elements to determine the image channel position information for the downsampled image channel information according to a first position rule of plural available position rules, each of the plural available position rules for mapping the image channel position information to phase information in an X dimension and phase information in a Y dimension to facilitate horizontal and vertical flipping or rotating of the image; and
using the image channel position information to perform a horizontal flip, vertical flip, or rotation of the compressed image.

20. The method of claim 19, wherein the downsampled image channel information comprises downsampled chroma information, and wherein the image channel position information comprises chroma position information.

21. A method comprising:
using a computing device,
receiving encoded digital image data for an image, the encoded digital image data comprising chroma information;
decoding chroma position information for downsampled chroma information by decoding one or more syntax elements in the encoded digital image data that indicate the chroma position information, the chroma position information indicating a position of the chroma information relative to luminance information in an X dimension and in a Y dimension; and
re-encoding at least part of the received digital image data under a transformation, wherein the transformation is a horizontal flip, vertical flip, rotation or crop;
wherein the re-encoding comprises modifying the chroma position information to reflect the transformation.

22. The method of claim 21 wherein the re-encoding comprises lossless encoding.

23. The method of claim 21 wherein the re-encoding comprises lossy encoding.

24. The method of claim 21 wherein the re-encoding comprises transform domain encoding.

25. One or more computer-readable storage devices storing computer-executable instructions which when executed by a computer cause the computer to perform a method, the method comprising:
receiving digital image data for an image, the digital image data comprising downsampled chroma information;
determining chroma position information for the downsampled chroma information according to a chroma position rule that maps the chroma position information to phase information in an X dimension and phase information in a Y dimension, and wherein the chroma position rule facilitates horizontal and vertical flipping or rotating of the image;

representing the chroma position information with one or more syntax elements included in an encoded bitstream; and outputting the encoded bitstream.

26. The one or more computer-readable storage devices of claim 25, wherein the chroma information is downsampled by a factor of two in one or more dimensions.

27. The one or more computer-readable storage devices of claim 25, wherein the phase information in the X dimension comprises half-pixel-unit phase information.

28. The one or more computer-readable storage devices of claim 25, wherein the phase information in the Y dimension or the X dimension comprises quarter-pixel-unit phase information.

29. The one or more computer-readable storage devices of claim 25, wherein the chroma position rule maps the chroma position information to chroma centering phases that include X phase positions 0, 0.5 and 1, and Y phase positions 0, 0.25, 0.5, 0.75, and 1, where the phase positions are in pixel units.

30. The one or more computer-readable storage devices of claim 25, wherein the one or more syntax elements comprises a single syntax element that represents both the phase information in the X dimension and the phase information in the Y dimension.

31. The one or more computer-readable storage devices of claim 25, wherein the one or more syntax elements comprises a first syntax element that represents the phase information in the X dimension and a second syntax element that represents the phase information in the Y dimension.

32. The one or more computer-readable storage devices of claim 25, wherein the digital image data comprises interlaced digital image data.

33. The one or more computer-readable storage devices of claim 25, wherein the chroma position rule maps the chroma position information to chroma centering phases that include phase positions −0.5, −0.25, 0, 0.25, 0.5, 0.75, 1, 1.25 and 1.5, where the phase positions are in pixel units.

34. The one or more computer-readable storage devices of claim 33, wherein the chroma position rule also facilitates translation of the image by an integer number of pixels.

35. The one or more computer-readable storage devices of claim 25, further comprising using the chroma position information to upsample the downsampled chroma information.

36. One or more computer-readable storage devices storing computer-executable instructions which when executed by a computer cause the computer to perform a method, the method comprising:

receiving encoded digital image data for an image, the encoded digital image data comprising chroma information;

processing chroma position information for the chroma information, wherein the chroma position information indicates a position of the chroma information relative to luminance information in an X dimension and in a Y dimension and facilitates horizontal and vertical flipping or rotating of the image, and wherein the processing comprises processing one or more syntax elements of the encoded digital image data that signal the chroma position information; and outputting a decoded bitstream.

37. The one or more computer-readable storage devices of claim 36, wherein the chroma information is downsampled by a factor of two in one or more dimensions.

38. The one or more computer-readable storage devices of claim 36, wherein the chroma position information indicates that the chroma information is offset relative to the luminance information in the X dimension by a half pixel in luma pixel units.

39. The one or more computer-readable storage devices of claim 36, wherein the chroma position information indicates that the chroma information is offset relative to the luminance information in the Y dimension or the X dimension comprises by a quarter pixel in luma pixel units.

40. The one or more computer-readable storage devices of claim 36, wherein the one or more syntax elements comprise a single syntax element that represents both the chroma position information in the X dimension and the chroma position information in the Y dimension.

41. The one or more computer-readable storage devices of claim 36, wherein the one or more syntax elements comprise a first syntax element that represents the chroma position information in the X dimension and a second syntax element that represents the chroma position information in the Y dimension.

42. The one or more computer-readable storage devices of claim 36, further comprising using the chroma position information to upsample the chroma information.

* * * * *